United States Patent [19]

Wallace

[11] 4,405,255
[45] Sep. 20, 1983

[54] ATTACHMENT OF FRAME SECTIONS

[76] Inventor: Robert S. Wallace, 823 S. Longwood Ave., Los Angeles, Calif. 90005

[21] Appl. No.: 344,888

[22] Filed: Feb. 2, 1982

[51] Int. Cl.³ .............................................. G09F 1/12
[52] U.S. Cl. ................................... 403/402; 403/295
[58] Field of Search ............... 403/401, 402, 295, 294

[56] References Cited

U.S. PATENT DOCUMENTS 2,989,788  6/1961  Kessler .................................. 403/295
4,157,641  6/1979  Hasselbacher .................. 403/294 X

FOREIGN PATENT DOCUMENTS 2315627  1/1977  France ................................. 403/402

Primary Examiner—Andrew V. Kundrat
Attorney, Agent, or Firm—William W. Haefliger

[57] ABSTRACT

A locking bracket is adapted to join together two metallic frame members forming an L-shaped joint, the members having channel shaped cross sections. The bracket includes (a) an L-shaped non-metallic body with legs formed for reception into the respective members to bridge the joint, (b) the legs having sections that taper in downward directions of reception into the members for interference interfit with shoulders defined by the members, (c) and the legs having ledges that face in upward directions opposite to fit closely under and forcibly engage shoulders on member flanges in response to completed reception of the legs into the members.

Pins may be provided to positively hold the legs to the members, and at locations to prevent member relative pivoting.

21 Claims, 12 Drawing Figures

ATTACHMENT OF FRAME SECTIONS

BACKGROUND OF THE INVENTION

This invention relates generally to the interconnection of frame members, as for example picture frame members; more particularly it concerns brackets for holding the members in tight, rigid, L-shaped configuration.

In the past, framing of pictures has required the services of picture framers. In an effort to reduce the cost of such services, attempts were made to provide brackets to hold the ends of frame members together, in L-shaped configuration, at the four corners of the frame; however, such attempts lack the unusual structural combinations, modes of operation and results of the present invention; and such attempts often resulted in undesirably loose connections at the frame corners. U.S. Pat. No. 3,534,490 to Herbert discloses one such prior bracket requiring manipulation of set screws on the brackets, but these can work loose, and do not provide a positive connection of the frame members.

SUMMARY OF THE INVENTION

It is a major object of the invention to provide a solution to the above described problem and deficiencies, and resulting in an easily applied frame corner bracket which positively holds the frame member ends together, in a rigid assembly. Basically, the locking bracket of the invention comprises:

(a) an L-shaped non-metallic body with legs formed for reception into the respective members to bridge the joint therebetween, (b) the legs having sections that taper in downward directions of reception into said members for interference interfit with shoulders defined by said members, (c) and the legs having ledges that face in upward directions opposite to said downward directions to fit closely under and forcibly engage shoulders on member flanges in response to completed reception of the legs into said members.

As will appear, the sections may have wedge shape in planes normal to the legs, with the ledges located at the rearward terminals of the wedge shapes to tightly fit under frame member flange terminals or lips; at least one leg may have an end lever portion which projects relatively lengthwise of the leg and upwardly, and has a downward facing fulchrum to engage a web defined by one of the members, whereby the end lever portion may be pressed downwardly into said channel shaped member while pivoting about said fulchrum; the lever portions may have hinge connection to base portions of the legs; ribs may be provided on such base portion to provide compression fit of the base portions in the frame members; and shear fasteners may be associated with the legs, and at opposite sides of a joint line defined by the interengaged ends of the frame members, to positively hold those ends in interengagement, providing a rigid assembly.

It is a further object to provide a combination comprising two frame members extending in joined together L-shaped configuration and an L-shaped bracket with legs received in channel shaped recesses defined by the frame members, each leg having a wedge interconnection with a frame member at one location, and a shear connectin with that frame member at a second location, the second location being closer to the joint formed by interengaged ends of the frame member than the first location.

These and other objects and advantages of the invention, as well as the details of an illustrative embodiment, will be more fully understood from the following specification and drawings, in which:

DRAWING DESCRIPTION

DETAILED DESCRIPTION

Figure 1:
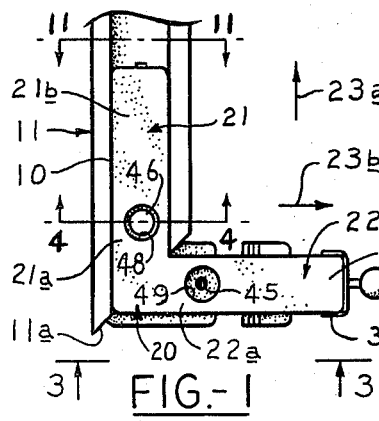
FIG. 1 is a plan view of a locking bracket embodying the invention; and, FIG. 1a is a plan view of a joint formed by L-shaped channel members.
Figure 2:
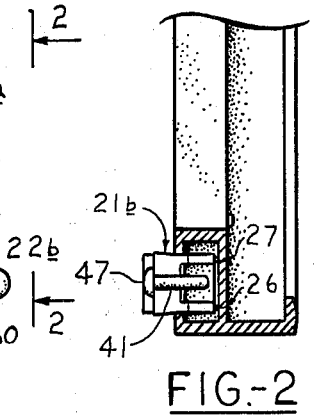
FIG. 2 is a view on lines 2—2 of FIG. 1.

In FIGS. 1-6 and 11, a locking bracket 10 is adapted to join together two frame members 11 and 12 (as for example picture frame members), forming an L-shaped joint. The latter is of the type shown in FIG. 1a, where members 11 and 12 have ends 11a and 12a extending at 45° angles relative to the member lengths, and those ends meet at joint line 13. Typically, the members 11 and 12 have channel shape cross sections (see FIG. 11), wherein flanges 14 and 15 are upstanding from a web or cross member 16, and the flanges have in-turned lips 17 and 18. The illustrated frame members also have lower L-shaped portions 95 to receive a picture.

Figure 1A:
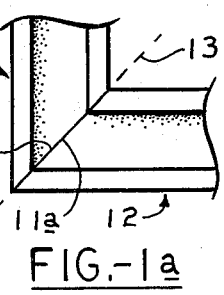

It is very desirable that the members 11 and 12 be quickly assembled to the state as shown in FIG. 1a, and rigidly held in that position, as by low cost bracket structure embodying a minimum of parts, and capable of quick and easy assembly to the frame members, as by a buyer of a picture frame assembly. Such frame members may be metallic.

Figure 4:
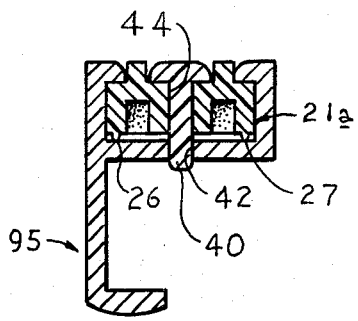
FIG. 4 is a section on lines 4—4 of FIG. 1.

As shown, the L-shaped bracket 10 includes a body 20 (typically non-metallic, as for example molded plastic) with L-shaped legs 21 and 22 respectively receivable endwise (direction of arrows 23a and 23b in FIG. 11) into the frame members 11 and 12, to bridge the joint (see joint line 13 in FIG. 1a). The legs have base portions 21a and 22a sized or adapted to fit closely between the webs 16 and lips 17 and 18, and between the flanges 14 and 15 of the members 11 and 12, as seen in FIG. 4. Pairs of narrow, endwise extending ribs 26 and 27 on those base portions engage the web 16, and are deflectible or compressible to provide a tight, compressible fit between the web 16 and the lips 17 and 18, accommodating the bracket to variable tolerances of different frame members, as wll occur in production.

Figure 3:
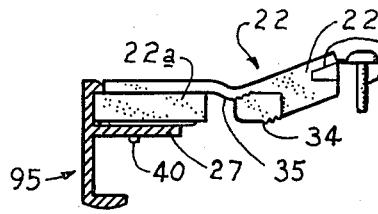
FIG. 3 is a view on lines 3—3 of FIG. 1.
Figure 5:
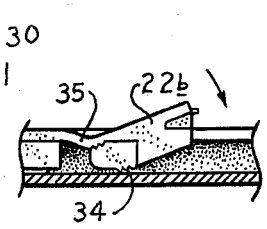
FIG. 5 is a view like FIG. 3, but showing an intermediate stage in the installation of the bracket.
Figure 6:
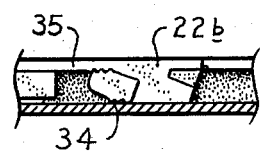
FIG. 6 is a view like FIG. 5, but showing a final stage in installation of the bracket.

In addition, the legs have outer sections 21b and 22b, located beyond the base portions 21a and 22a, that taper in downward direction of reception into the members (see the installation sequence of FIGS. 3, 5 and 6) for interference interfit with shoulders defined by the members (see for example terminals 17a and 18a on lips 17 and 18). Also, the leg outer sections 21b and 22b have ledges (see for example ledges 30 and 31 in FIG. 11) that face in upward directions opposite to downward directions (see downward arrow 32 in FIG. 11) to fit closely under and forcibly engage shoulders on the flanges in response to completed reception of the legs into the members (see for example shoulders 17b and 18b in FIG. 11). FIGS. 3, 5 and 6 show the installation sequence, after reception of the base portions 21a and 22a into the members 11 and 12 to interengage ends 11a and 12a at joint line 13. In this regard, the legs typically have end lever portions (exemplified for example by sections 21b and 22b) which initially project relatively endwise and upwardly (as shown in FIG. 3), and they have downward facing fulcrums, one of which is shown at 34, located beyond integral flexures 35, to engage the web surfaces 16a, whereby the end lever portions may be pressed downwardly, as in FIGS. 5 and 6, into the channel shaped members while pivoting about the fulchrum. Note that the flexures 35, which are upwardly concave in FIGS. 3 and 5, are flat in FIG. 6, to provide a uniformly flat continuous surface lengthwise of the bracket leg.

Such installation brings the ledges 30 and 31 under the shoulders 17b and 18b, to interfit therewith. To this end, the sections 21b and 22b have wedge shape (in FIG. 11) in planes normal to the legs; that is, they have surfaces 21c and 22c that taper downwardly as shown, from the ledges.

Also provided are shear fasteners 40 and 41 projecting downwardly from the leg base portions 21a and 22a into holes as at 42 drilled or formed in the webs 16. The fasteners fit tightly in those holes and in openings 44 and 45 in the leg base portions, with fastener heads 46 and 47 received in recesses 48 and 49 in the tops of the base portions. The fasteners are located at opposite sides of the junction line at the interengaged ends 12a and 11a of the frame members (i.e. close to those ends), whereby they hold those ends against separation, or pivoted separation, assisting in the provision of a rigid interconnection of the frame members. Fasteners 40 and 41 are not tension transmitting elements, but are rather shear force transmitting elements to prevent separation of the member ends 21a and 22a.

In FIGS. 7-10, the modified bracket 100 is similar to bracket 10, and corresponding parts have the same members, with a "1" added in the hundredths position. No pivoting elements corresponding to elements 34 and 35 in FIGS. 1-6 are used; rather, the legs 121 and 122 are pushed downwardly into the channel shaped members 111 and 112. The fasteners 140 and 141 are defined by studs which are integral with the legs.

The bracket 10 typically consist of plastic material, such as NYLON for example, or any plastic material of high tensile strength.

With the recesses 48 and 49, and holes 42 at opposite sides of line 13, as in FIG. 1, the frame sections cannot pivot apart in any direction.

Figure 7:
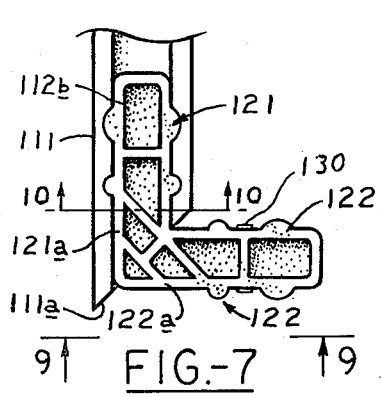
FIG. 7 is a plan view of a modified bracket.
Figure 8:
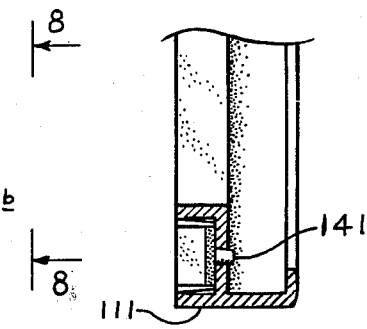
FIG. 8 is a view taken on lines 8—8 of FIG. 7.
Figure 10:
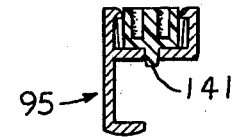
FIG. 10 is a section on lines 10—10 of FIG. 7.
Figure 9:
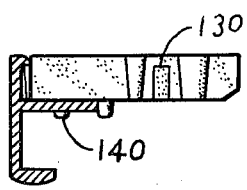
FIG. 9 is a view taken on lines 9—9 of FIG. 7.
Figure 11:
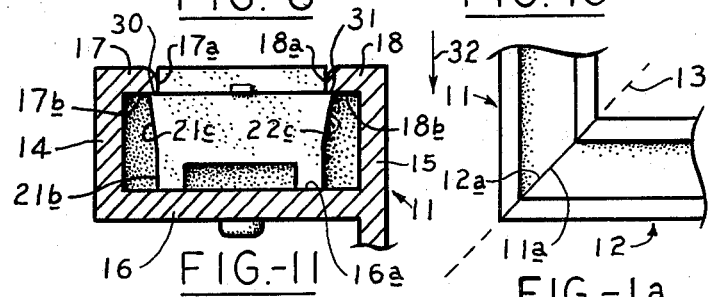
FIG. 11 is an enlarged section taken on lines 11—11 of FIG. 1.

In FIGS. 7 and 9, shoulders 130 correspond to shoulders 30, in FIGS. 3 and 11.

FIG. 3 shows pin 41 stored in as molded condition, integral with leg 22, and prior to cut-off, for subsequent insertion in hole 45.

I claim:

1. A locking bracket adapted to join together two metallic frame members forming an L-shaped joint, said members having channel shaped cross sections, comprising
   (a) an L-shaped non-metallic body with legs formed for reception into the respective members to bridge said joint,
   (b) the legs having sections that taper in downward directions of reception into said members for interference interfit with shoulders defined by said members,
   (c) the legs having ledges that face in upward directions opposite to said downward directions to fit closely under and forcibly engage shoulders on member flanges in response to completed reception of the legs into said members,
   (d) and ribbing on and projecting downwardly from said legs to compressively engage member webs so that said ledges will forcibly engage said member flanges.

2. The bracket of claim 1 wherein said sections have wedge shapes in planes normal to said legs.

3. The bracket of claim 2 wherein said ledges are located at the rearward terminals of said wedge shapes to fit under flange terminals which are in-turned toward one another.

4. The bracket of claim 3 including said members receiving said legs and held together by said body.

5. A locking bracket adapted to join together two metallic frame members forming an L-shaped joint, said members having channel shaped cross sections, comprising
   (a) an L-shaped non-metallic body with legs formed for reception into the respective members to bridge said joint,
   (b) the legs having sections that taper in downward directions of reception into said members for interference interfit with shoulders defined by said members,
   (c) and the legs having ledges that face in upward directions opposite to said downward directions to fit closely under and forcibly engage shoulders on member flanges in response to completed reception of the legs into said members,
   (d) at least one leg having an end lever portion which projects relatively lengthwise of the leg and upwardly, and having a downward facing fulcrum to engage a web defined by one of the members whereby the end lever portion may be pressed downwardly into said channel shaped member while pivoting about said fulcrum.

6. The bracket of claim 5 wherein said end lever portion has hinge connection to the remainder of said one leg.

7. A locking bracket adapted to join together two metallic frame members forming an L-shaped joint, said members having channel shaped cross sections, comprising
   (a) an L-shaped body with legs formed for reception into the respective members to bridge said joint,
   (b) the legs having sections that taper in downward directions of reception into said members for interference interfit with shoulders defined by said members,
   (c) and the legs having ledges that face in upward directions opposite to said downward directions to fit closely under and forcibly engage shoulders on member flanges in response to completed reception of the legs into said members,
   (d) each of said legs having an end lever portion which projects relatively lengthwise of the leg and upwardly, and has a downward facing fulcrum to engage a web defined by the corresponding member, whereby the end lever portion may be pressed downwardly into said channel shaped member while pivoting about said fulcrum.

8. The bracket of claim 7 wherein each end lever portion has hinge connection to the remainder of the corresponding leg.

9. The bracket of claim 8 including said members receiving said legs and held together by said body.

10. The bracket of claim 6 including at least one lengthwise extending rib on and projecting downwardly from the under surface of said remainder of the one leg, and adapted to compressively engage said web.

11. The bracket of claim 1 including shear fasteners projecting downwardly through said openings and from said legs for reception in holes formed in webs defined by said members.

12. The bracket of claim 11 including said members having said web holes receiving said fasteners.

13. A locking bracket adapted to join together two metallic frame members forming an L-shaped joint, said members having channel shaped across sections, comprising (a) an L-shaped non-metallic body with legs formed for reception into the respective members to bridge said joint, (b) the legs having sections that taper in downward directions of reception into said members for interference interfit with shoulders defined by said members, (c) and the legs having ledges that face in upward directions opposite to said downward directions to fit closely under and forcibly engage shoulders on member flanges in response to completed reception of the legs into said members, (d) and including shear fasteners projecting downwardly from said legs for reception in holes formed in webs defined by said members, and including said members with said holes located at opposite sides of a junction defined by said members, said fasteners being defined by studs integral with said legs.

14. The bracket of claim 12 wherein said fasteners project downwardly through said legs and are separate therefrom.

15. The bracket of claim 5 including shear fasteners projecting downwardly from said legs for reception in holes formed in webs defined by said members.

16. The bracket of claim 15 including said members having said web holes receiving said fasteners, said fasteners and holes located at opposite sides of a junction defined by said members.

17. The bracket of claim 16 wherein said fasteners are defined by studs integral with said legs.

18. The bracket of claim 16 wherein said fasteners project downwardly through said legs and are separate therefrom.

19. The bracket of claim 1 wherein the body consists of molded plastic material.

20. The combination comprising two frame members extending in joined together L-shaped configuration, and an L-shaped bracket with legs received in channel shaped recesses defined by the frame members, each leg having a fulcrum providing wedge interconnection with a frame member at one location, and shear connection with that frame member at a second location, the second location being closer to the joint formed by interengaged ends of the frame members than the first location.

21. The combination of claim 5 including narrow ribbing on and projecting downwardly from at least one leg to compressively engage the web associated with that leg.

* * * * *